(12) United States Patent
Kojima et al.

(10) Patent No.: US 6,510,844 B2
(45) Date of Patent: Jan. 28, 2003

(54) FUEL SUPPLYING APPARATUS AND CONTROL METHOD THEREOF

(75) Inventors: Susumu Kojima, Susono (JP); Keiso Takeda, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/838,199

(22) Filed: Apr. 20, 2001

(65) Prior Publication Data

US 2001/0045208 A1 Nov. 29, 2001

(30) Foreign Application Priority Data

May 11, 2000 (JP) .......................................... 2000-143415

(51) Int. Cl.[7] .............................................. F02M 37/20
(52) U.S. Cl. ..................................... 123/512; 123/516
(58) Field of Search .............................. 123/510, 511, 123/512, 513, 514, 516, 464

(56) References Cited

U.S. PATENT DOCUMENTS

| | | | |
|---|---|---|---|
| 4,404,944 A | * 9/1983 | Yamazaki et al. ...... | 123/512 X |
| 5,111,844 A | * 5/1992 | Emmert et al. ......... | 123/514 X |
| 5,263,459 A | 11/1993 | Talaski ................... | 123/516 |
| 5,275,145 A | 1/1994 | Tuckey .................. | 123/521 |
| 5,718,208 A | * 2/1998 | Brautigan et al. ...... | 123/516 |
| 5,809,975 A | * 9/1998 | Tuckey et al. .......... | 123/514 X |
| 5,881,698 A | * 3/1999 | Tuckey et al. .......... | 123/516 X |
| 6,039,548 A | * 3/2000 | Ley et al. ............... | 123/516 X |
| 6,089,249 A | 7/2000 | Thibaut et al. ......... | 137/202 |
| 6,302,137 B1 | * 10/2001 | Devall ................... | 137/202 |

FOREIGN PATENT DOCUMENTS

| | | |
|---|---|---|
| EP | 0 943 476 A1 | 9/1999 |
| JP | A-63-71569 | 3/1988 |
| JP | A 05-071430 | 3/1993 |
| JP | A 10-281021 | 10/1998 |
| JP | A 11-030158 | 2/1999 |
| JP | A-11-141438 | 5/1999 |

* cited by examiner

Primary Examiner—Tony M. Argenbright
(74) Attorney, Agent, or Firm—Oliff & Berridge, PLC

(57) ABSTRACT

A fuel supplying apparatus has a fuel pump for pumping fuel stored in a fuel tank. The fuel pump supplies fuel from the fuel tank to outside the fuel tank via a take-up portion having a fuel take-up opening that opens in the fuel in the fuel tank and a gas take-up opening that opens in a space formed above the fuel liquid surface in the fuel tank. Fuel vapor formed in the fuel tank can be supplied to outside the fuel tank without being released to the atmosphere, by using a minimal number of component elements.

24 Claims, 5 Drawing Sheets

FUEL SUPPLYING APPARATUS AND CONTROL METHOD THEREOF

INCORPORATION BY REFERENCE

The disclosure of Japanese Patent Application No. 12-143415 filed on May 11, 2000, including the specification, drawings and abstract is incorporated herein by reference in its entirety.

BACKGROUND OF THE INVENTION

1. Field of Invention

The invention relates to a fuel supplying apparatus and to a control method thereof.

2. Description of Related Art

A fuel supplying apparatus equipped with a fuel pump for pumping fuel stored in a fuel tank is known. In such a fuel supplying apparatus, a space is formed above a fuel liquid surface within the fuel tank, and fuel vaporizes into the space. In the apparatus, fuel vaporized (hereinafter, referred to as "fuel vapor") in the space above the fuel liquid surface may be released into the atmosphere, and therefore, a measure for preventing release of fuel vapor into the atmosphere is needed. With regard to such measures, there are two major concepts: a concept in which fuel vaporization in the fuel tank is reduced; and another concept in which fuel vapor formed in the fuel tank is properly treated.

In reality, however, attempts to suppress vaporization of fuel within the fuel tank fail to achieve complete suppression of fuel vaporization, i.e., they allow fuel vaporization to some extent. Therefore, vapor formed within a fuel tank must be appropriately treated. Such a treatment can be realized by, for example, a technique in which an intake passage of an internal combustion engine is connected as a negative pressure source to a fuel tank, so that fuel vapor is drawn out from the fuel tank and into the intake passage due to the negative pressure source, and is treated outside the fuel tank. In this art, fuel vapor drawn out of the fuel tank is introduced into the internal combustion engine via the intake passage, and is thus treated.

However, if negative pressure occurs in the intake passage, the fuel economy of the internal combustion engine as a whole deteriorates. Therefore, there is a recent trend toward prevention of negative pressure in the intake passage or minimization of negative pressure if negative pressure is allowed to occur. However, an internal combustion engine in which the negative pressure generated in the intake passage is reduced has a problem of being no longer capable of drawing fuel vapor from the fuel tank into the intake passage. A technique for solving this problem is disclosed in Japanese Patent Application Laid-Open No. 11-30158. In this patent application, a pump provided specifically for pumping fuel vapor from the fuel tank is used to introduce fuel vapor into the intake passage.

The technique disclosed in that patent application employs the pump for pumping fuel vapor, in addition to component elements indispensable for the functions of the fuel supplying apparatus. Such an added component element (i.e., the pump) causes a problem of increased production costs.

SUMMARY OF THE INVENTION

The invention has been accomplished in view of the aforementioned problems. It is an object of the invention to treat vapor formed in a fuel tank while requiring only a minimal number of component elements.

To achieve the above and/or other objects, the invention provides a fuel supplying apparatus that has a fuel pump for supplying fuel stored in a fuel tank and that also evacuates the gas (including fuel vapor) from the fuel tank by using the fuel pump. The fuel pump supplies the fuel from the fuel tank to outside the fuel tank via a take-up portion having a fuel take-up opening that is opened at a lower location in the fuel tank and a gas take-up opening that is opened above the fuel take-up opening within the fuel tank. Since the gas take-up opening is normally opened in a space formed above the fuel liquid surface, the fuel pump, when supplying fuel from the fuel tank, takes up gas (including air and fuel vapor) via the gas take-up opening, as well as the fuel via the fuel take-up opening. Therefore, fuel vapor formed above the fuel liquid surface in the fuel tank is discharged together with fuel into a device provided outside the fuel tank. Hence, fuel vapor is prevented from being released from the fuel tank into the atmosphere.

BRIEF DESCRIPTION OF THE DRAWINGS

The above and other objects, features, advantages, and technical and industrial significance of this invention will be better understood by reading the following detailed description of preferred embodiments of the invention, when considered in connection with the accompanying drawings, in which.

DETAILED DESCRIPTION OF PREFERRED EMBODIMENTS

In the following description and the accompanying drawings, the invention will be described in more detail in terms of preferred embodiments.

Figure 1:
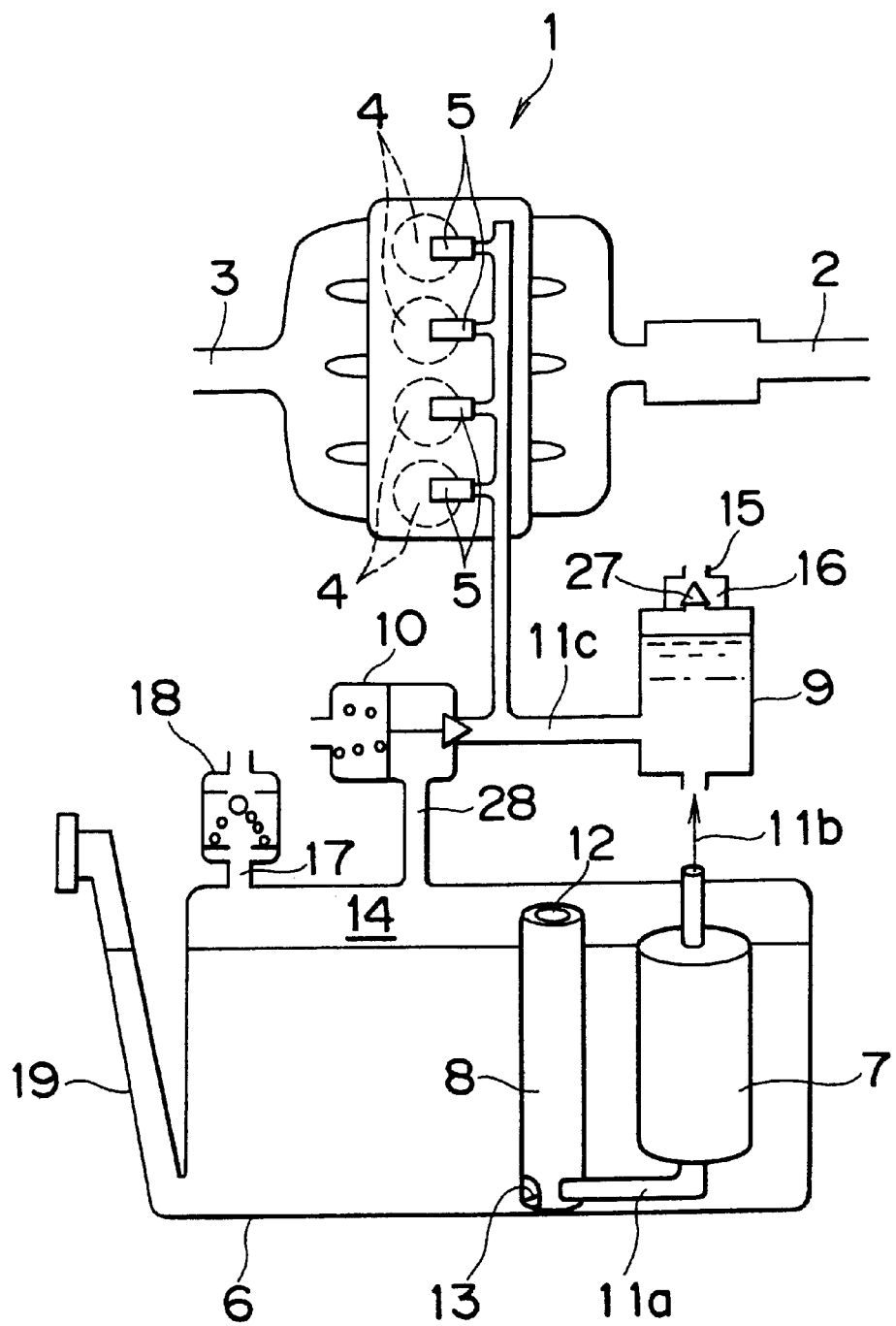
FIG. 1 is a diagram illustrating an internal combustion engine equipped with a fuel supplying apparatus in accordance with a first embodiment of the invention.

The fuel supplying apparatus of the invention will be described in detail with reference to embodiments shown in the drawings. FIG. 1 shows a fuel supplying apparatus in accordance with a first embodiment of the invention applied to a direct fuel injection type internal combustion engine 1. The internal combustion engine 1 in this case is designed so that the negative pressure occurring in an intake passage is very small. Also shown in FIG. 1 are an intake passage 2, an exhaust passage 3, combustion chambers 4, and fuel injection valves 5. The engine 1 has four combustion chambers 4. Although the engine 1 is a four-cylinder engine in this illustration, the invention is not limited to this construction. The fuel supplying apparatus of the invention is also applicable to internal combustion engines having 6 cylinders, 8 cylinders, etc. The fuel injection valves 5 are disposed in a one-to-one correspondence with the combustion chambers 4.

The fuel supplying apparatus of the first embodiment includes a fuel pump 7 for pumping fuel stored in a fuel tank 6, a take-up portion 8, an air separator 9, and a fuel pressure adjuster 10. These components will be sequentially described below. The fuel pump 7 in the first embodiment is preferably a positive-displacement pump.

The take-up portion 8 is connected to the fuel pump 7 via a fuel supplying passage 11a. The fuel pump 7 draws fuel in the fuel tank 6 via the take-up portion 8. The take-up portion 8 in this embodiment is a take-up pipe having two openings 12, 13. One opening 13 of the take-up pipe 8 is located near a lower portion of the fuel tank 6, more specifically, near a bottom wall of the fuel tank 6. Thus, the opening 13 is disposed in fuel liquid within the fuel tank 6 during a normal state other than a state where fuel has nearly run out. Therefore, the opening 13 serves mainly as an opening for taking up fuel (hereinafter, referred to as "fuel take-up opening"). The other opening 12 of the take-up pipe 8 is located above the fuel take-up opening 13, more specifically, near an upper wall of the fuel tank 6. The opening 12 remains open in a space 14 formed above the fuel liquid surface within the fuel tank 6 during a normal state other than a state where the fuel tank is completely filled with fuel. Therefore, the opening 12 serves mainly as an opening for taking up gas (i.e., air and fuel vapor) (hereinafter, referred to as "gas take-up opening"). In the foregoing description, the terms "lower", "above" and the like refer to the directions of gravity.

With regard to the uptake of gas from the space 14 above the fuel liquid surface via the gas take-up opening 12 and the uptake of fuel via the fuel take-up opening 13 by the fuel pump 7, it is effective to provide some contrivance, for example, a constriction of the take-up openings, so as to prevent the uptake of only fuel or gas via one of the two openings.

The air separator 9 is connected to the fuel pump 7 via a fuel supplying passage 11b. The fuel pump 7 pumps fuel to the air separator 9. The air separator 9 in the first embodiment is a vessel having a fixed capacity (hereinafter, referred to as "air separating vessel"). Fuel flows into the air separating vessel 9 via a bottom wall thereof, and flows out via a lower side wall portion. When fuel passes through the air separating vessel 9 in this manner, air separates from fuel. As a result, only fuel flows out from the air separating vessel 9. An atmospheric opening 15 is formed in an upper wall of the air separating vessel 9. The atmospheric opening 15 communicates with the atmosphere via a float-type shutoff valve 16. The shutoff valve 16 shuts the atmospheric opening 15 by a float 27 when fuel held within the air separating vessel 9 reaches the shutoff valve 16. Thus, the shutoff valve 16 prevents fuel from flowing out of the air separating vessel 9 into the atmosphere. The air separating vessel 9 is connected to the fuel injection valves 5 via a fuel supplying passage 11c.

The fuel pressure adjuster 10 is disposed in the fuel supplying passage 11c between the air separating vessel 9 and the fuel injection valves 5. The fuel pressure adjuster 10 in the first embodiment is a relief valve. The relief valve 10 opens when the pressure in the fuel supplying passage 11c reaches or exceeds a predetermined pressure. The relief valve 10 remains closed at or below the predetermined pressure. In this embodiment, this predetermined pressure is set to or above the vapor pressure of the fuel. As a result, the pressure in the fuel supplying passage 11c, the air separating vessel 9 and the fuel supplying passage 11b is maintained at or above the vapor pressure of the fuel. The relief valve 10 is connected to the fuel tank 6 via a return passage 28. Therefore, when the relief valve 10 opens, fuel flowing into the relief valve 10 from the fuel supplying passage 11c returns into the fuel tank 6 via the return passage 28.

Another atmospheric opening 17 is formed in the upper wall of the fuel tank 6. The atmospheric opening 17 is opened to the atmosphere via a relief valve 18. The relief valve 18 opens when the pressure in the fuel tank 6 becomes equal to or less than a predetermined pressure (negative pressure). In that case, air flows from the atmosphere into the fuel tank 6. In this manner, excessively low pressure in the fuel tank 6 is prevented.

A fuel filler pipe 19 is connected to a lower side wall portion of the fuel tank 6. Fuel is fed into the fuel tank 6 via the fuel filler pipe 19.

The above-described fuel supplying apparatus of the first embodiment supplies fuel while treating vapor formed in the fuel tank 6 in a manner as described below.

When the fuel pump 7 is operated to supply fuel, fuel is taken up via the fuel take-up opening 13 of the take-up pipe 8, and simultaneously, air and vaporized fuel (hereinafter, referred to as "fuel vapor") in the space 14 are taken up via the gas take-up opening 12. As a result, fuel liquid mixed with air and fuel vapor is introduced into the air separating vessel 9 from the fuel pump 7. In this manner, fuel vapor in the fuel tank 6 is discharged out into the air separating vessel 9, which is a device provided outside the fuel tank 6. Furthermore, since the pressure in the space 14 of the fuel tank 6 is set to a negative pressure, fuel vapor is prevented from being released from the fuel tank 6 into the atmosphere.

In the first embodiment, the pressure of fuel (hereinafter, referred to as "fuel pressure") is maintained at or above the vapor pressure of fuel owing to the operation of the relief valve 10. Therefore, fuel vapor contained in fuel liquid changes into liquid. As a result, fuel flowing into the air separating vessel 9 contains substantially no fuel vapor, that is, the gas contained therein is substantially only air. Air is separated from fuel in the air separating vessel 9. Fuel vapor is treated in this manner, and only fuel liquid is supplied to the fuel injection valves 5. The vapor pressure of a fuel is determined by the temperature of the fuel and the chemical composition thereof. Therefore, the relief valve 10 may be replaced by a variable pressure valve whose valve opening pressure is variable in accordance with the fuel temperature or chemical composition.

Figure 2:
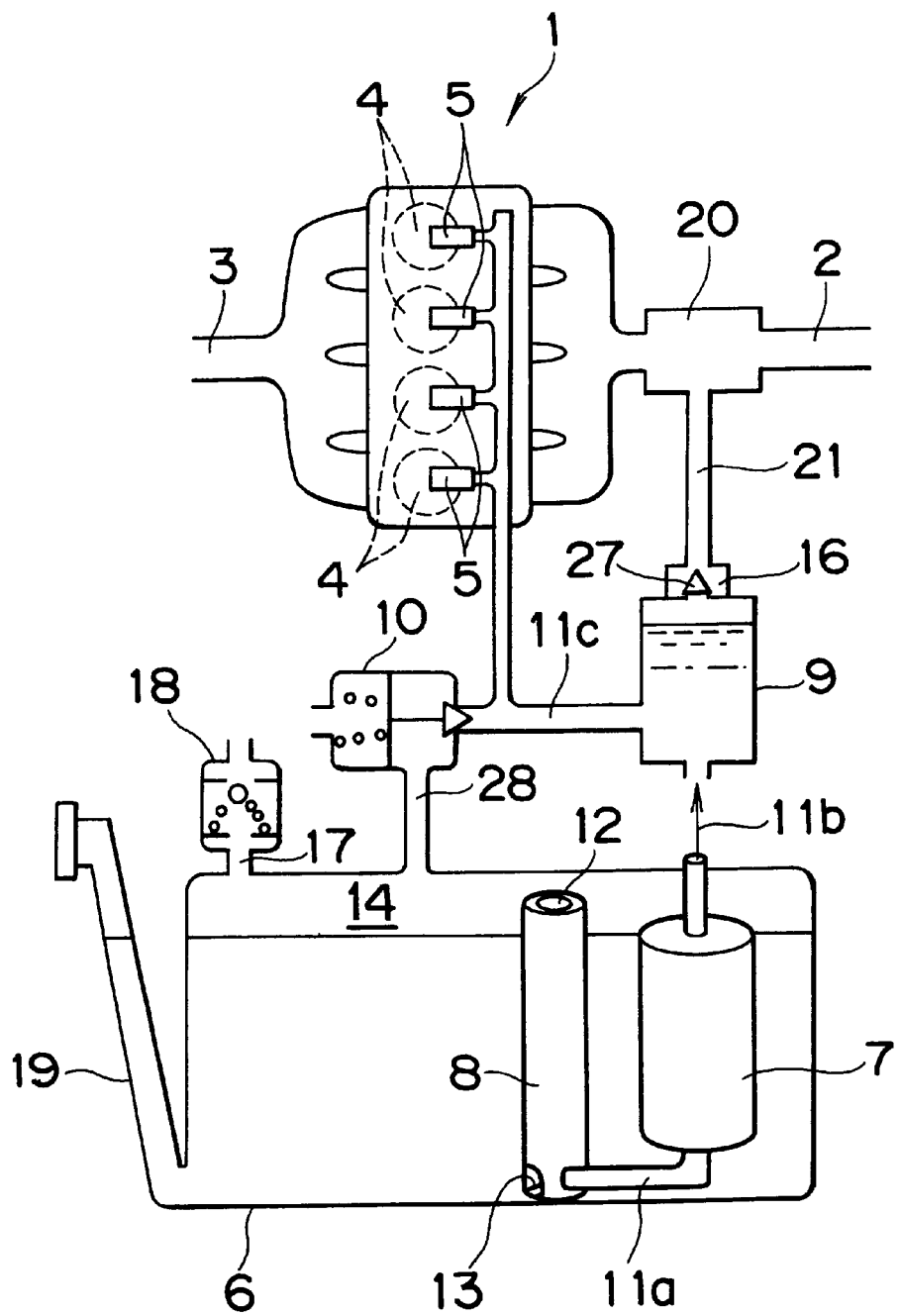
FIG. 2 is a diagram illustrating an internal combustion engine equipped with a fuel supplying apparatus in accordance with a second embodiment of the invention.

A fuel supplying apparatus in accordance with a second embodiment will be described with reference to FIG. 2. With regard to the fuel supplying apparatus of the first embodiment, it is conceivable that the air separating vessel 9 may separate not only air but also a small amount of fuel vapor from fuel liquid. If that happens, it becomes necessary to treat fuel vapor accumulated in the air separating vessel 9. In the second embodiment, therefore, the shutoff valve 16 attached to the air separating vessel 9 is connected to a surge tank 20 in an intake passage 2 via a purge passage 21, as shown in FIG. 2. The fuel pressure is maintained at or above the vapor pressure of fuel due to the operation of the relief valve 10 as mentioned above. The fuel pressure in the air separating vessel 9 is not an exception, that is, the fuel vapor accumulated in the air separating vessel 9 is pressurized at a high pressure. In the second embodiment, the air separating vessel 9 is connected to the surge tank 20, and the pressure of fuel vapor in the air separating vessel 9 is relatively high. Therefore, fuel vapor is favorably discharged from the air separating vessel 9 into the intake passage 2 even if no negative pressure is present in the intake passage 2. In this manner, fuel vapor in the air separating vessel 9 is treated. Other constructions of the second embodiment are substantially the same as those of the first embodiment, and will not be described again.

Figure 3:
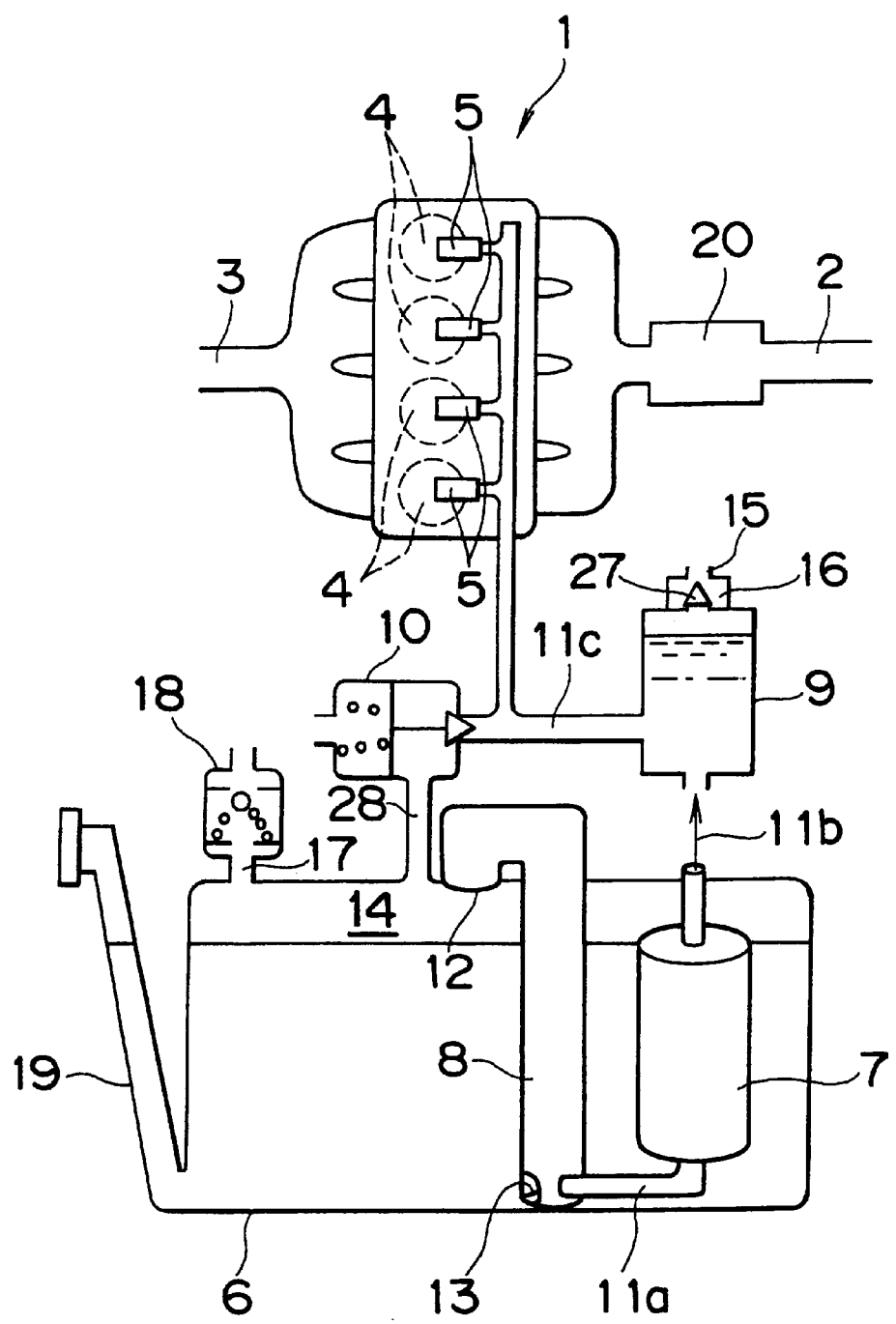
FIG. 3 is a diagram illustrating an internal combustion engine equipped with a fuel supplying apparatus in accordance with a third embodiment of the invention.

A third embodiment will be described with reference to FIG. 3. In the third embodiment, the take-up pipe 8 extends across an upper wall of the fuel tank 6, and is connected at an end thereof to the upper wall of the fuel tank 6 so that a gas take-up opening 12 of the take-up pipe 8 is opened from the side of the upper wall of the fuel tank 6 to the interior of the fuel tank 6. According to the third embodiment, the gas take-up opening 12 remains open to the space 14 formed within the fuel tank 6 unless the interior of the fuel tank 6 is completely filled with fuel. Therefore, fuel vapor in the fuel tank 6 can be more reliably treated.

The other components of the third embodiment are substantially the same as those of the first embodiment, and will not be described again. In the third embodiment, the air separating vessel 9 may be connected to the surge tank 20 of the intake passage 2 for the same reasons as stated above in conjunction with the second embodiment.

Figure 4:
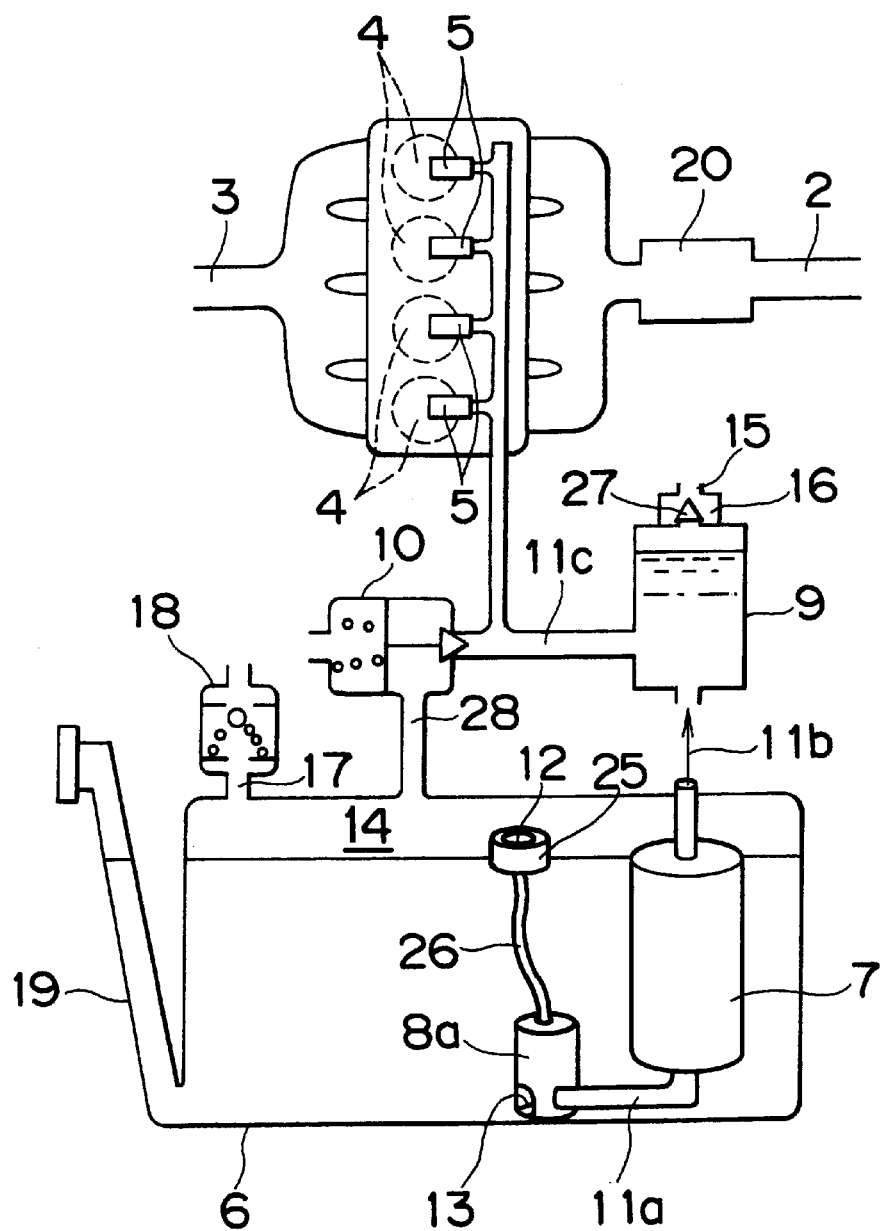
FIG. 4 is a diagram illustrating an internal combustion engine equipped with a fuel supplying apparatus in accordance with a fourth embodiment of the invention.

In a fourth embodiment shown in FIG. 4, a gas take-up opening 12 is formed in an upper wall face of a float 25 that is floatable on the fuel liquid surface. The float 25 is connected to a fixed lower pipe 8a that is disposed in a lower portion of the fuel tank 6, via a tube 26. The fuel take-up opening 13 is formed in the lower pipe 8a. The lower pipe 8a is connected to the fuel pump 7 via a fuel supplying passage 11a.

According to the fourth embodiment, the gas take-up opening 12 remains open to the space 14 formed in the fuel tank 6 unless the fuel tank 6 is completely filled with fuel. Therefore, fuel vapor in the fuel tank 6 can be reliably treated.

The other components of the fourth embodiment are substantially the same as those of the first embodiment, and will not be described again. In the fourth embodiment, as well, the air separating vessel 9 may be connected to the surge tank 20 of the intake passage 2 for the same reasons as mentioned above in conjunction with the second embodiment.

Figure 5:
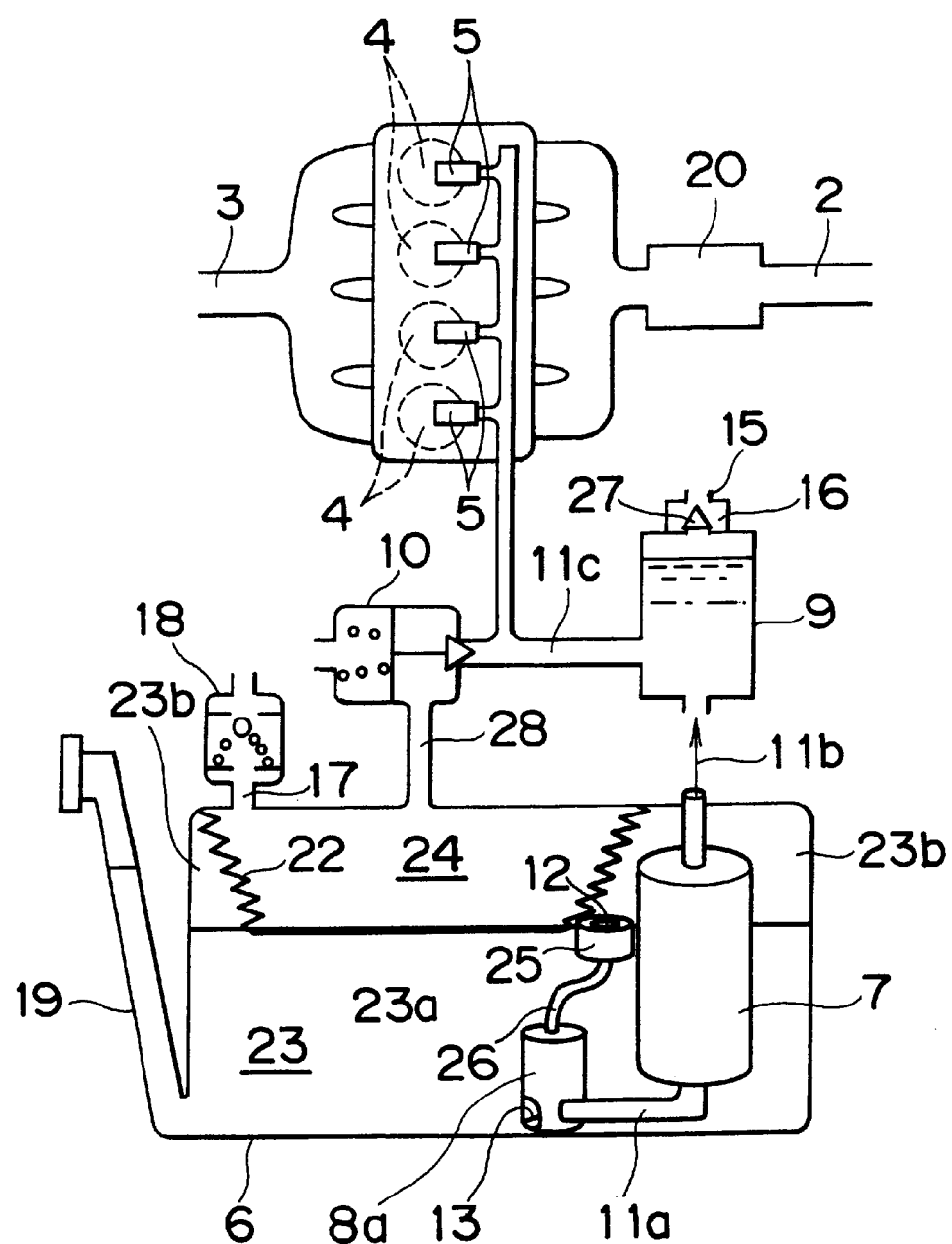
FIG. 5 is a diagram illustrating an internal combustion engine equipped with a fuel supplying apparatus in accordance with a fifth embodiment of the invention.

A fuel supplying apparatus in accordance with a fifth embodiment as shown in FIG. 5 is also effective. That is, as shown FIG. 5, the internal space of a fuel tank 6 is divided into a fuel chamber 23 containing fuel and an air chamber 24 containing air by a diaphragm (or separating wall) 22 that is displaceable so as to follow changes in the amount of fuel present in the fuel tank 6. The fuel chamber 23 has a fuel liquid portion (liquid-phase space) 23a and a gas portion (gas-phase space) 23b formed above the liquid-phase space 23a. In FIG. 5, a lower face of the air chamber 24 is in contact, via the diaphragm 22, with the liquid-phase space 23a. Above the lower face of the air chamber 24, the diaphragm 22 separates the air chamber 24 and the gas-phase space 23b from each other. The gas take-up opening 12 is formed in an upper wall face of a float 25 that is floatable on the fuel liquid surface. The float 25 and the lower pipe 8a having a fuel take-up opening 13 are interconnected by the tube 26. The float 25, the tube 26 and the lower pipe 8a form take-up portion 8. In this construction, fuel vapor in the gas-phase space 23b formed within the fuel chamber 23 is discharged out of the fuel tank 6 via the gas take-up opening 12, and the gas-phase space 23b has a negative pressure. Therefore, the diaphragm 22 is more likely to stick to the fuel liquid surface, thereby substantially preventing formation of a gas-phase space 23b within the fuel chamber 23. As the gas-phase space 23b decreases, the area of contact of fuel liquid present in the liquid-phase space 23a with the gas-phase space 23b decreases. Therefore, the amount of fuel vapor can be reduced.

Furthermore, since the gas-phase space 23b is relatively small, a small amount of fuel vapor is sufficient to bring about the saturated vapor pressure, at which point no more fuel vaporizes.

Thus, fuel vapor formed in the fuel chamber 23 can be favorably treated, and at the same time, formation of fuel vapor in the fuel chamber 23 can be curbed.

According to the first to fifth embodiments of the invention, fuel is taken up via the fuel take-up opening and simultaneously gas is taken up via the gas take-up opening, when the fuel pump supplies fuel from the fuel tank. Therefore, fuel vapor (vaporized fuel) formed above the fuel liquid surface in the fuel tank is discharged together with fuel liquid from the fuel tank to a device provided outside the fuel tank, so that fuel vapor will not be emitted into the atmosphere. Furthermore, these advantages can be achieved by a construction in which the number of component elements is minimized.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A fuel supplying apparatus for supplying a fuel, comprising:
    a fuel tank that stores the fuel therein;
    a fuel pump that pumps the fuel stored in the fuel tank out of the fuel tank;
    a take-up portion disposed in the fuel tank and having a fuel take-up opening that is opened at a lower position within the fuel tank and a gas take-up opening that is opened above the fuel take-up opening within the fuel tank, the take-up portion connected to the fuel pump;
    an air separator that separates an air contained in fuel from the fuel contained in a fuel supplying passage connected to a downstream side of the fuel pump, the air separator connected to a downstream side of the fuel pump; and
    a fuel pressure adjuster that adjusts a pressure of the fuel in the fuel supplying passage, to a predetermined pressure,
    wherein the fuel pump supplies the fuel in the fuel tank to an outside of the fuel tank, via the take-up portion.

2. A fuel supplying apparatus according to claim 1, wherein the predetermined pressure is at least a vapor pressure of the fuel.

3. A fuel supplying apparatus according to claim 1, wherein the fuel pressure adjuster adjusts the predetermined pressure in accordance with a temperature of the fuel or a chemical composition of the fuel.

4. A fuel supplying apparatus according to claim 1, wherein the fuel is supplied to an internal combustion engine by the fuel pump, and the air separated by the air separator is released into an intake passage of the internal combustion engine.

5. A fuel supplying apparatus according to claim 1, wherein the air separator has an atmospheric opening that is opened to an atmosphere, and a shutoff valve that closes the atmospheric opening, and wherein a fuel pressure adjuster disposed in a fuel supplying passage connected to the downstream side of the fuel pump to adjust a fuel pressure in the fuel supplying passage to a predetermined pressure is attached to a downstream side of the air separator, and wherein the air separated by the air separator is released into the atmosphere via the shutoff valve and the atmospheric opening.

6. A fuel supplying apparatus according to claim 1, wherein the gas take-up opening is fixed near an upper wall of the fuel tank.

7. A fuel supplying apparatus according to claim 6, wherein the gas take-up opening is fixed and attached to the upper wall of the fuel tank.

8. A fuel supplying apparatus according to claim 6, further comprising a fuel pressure adjuster that adjusts a pressure of the fuel in a fuel supplying passage connected to a downstream side of the fuel pump, to a predetermined pressure.

9. A fuel supplying apparatus according to claim 6, further comprising an air separator that separates an air contained in the fuel from the fuel, the air separator connected to a downstream side of the fuel pump.

10. A fuel supplying apparatus according to claim 1, wherein the gas take-up opening is provided on a float that is floatable on a fuel liquid surface within the fuel tank.

11. A fuel supplying apparatus according to claim 10, further comprising a fuel pressure adjuster that adjusts a pressure of the fuel in a fuel supplying passage connected to a downstream side of the fuel pump, to a predetermined pressure.

12. A fuel supplying apparatus according to claim 10, further comprising an air separator that separates an air contained in the fuel from the fuel, the air separator connected to a downstream side of the fuel pump.

13. A fuel supplying apparatus according to claim 1, further comprising a separating wall that is displaceable within an internal space of the fuel tank in accordance with an amount of the fuel stored in the fuel tank and that divides the internal space of the fuel tank into a fuel chamber and an air chamber, wherein the take-up portion is disposed inside the fuel chamber.

14. A fuel supplying apparatus according to claim 13, further comprising a fuel pressure adjuster that adjusts a pressure of the fuel in a fuel supplying passage connected to a downstream side of the fuel pump, to a predetermined pressure.

15. A fuel supplying apparatus according to claim 13, further comprising an air separator that separates an air contained in the fuel from the fuel, the air separator connected to a downstream side of the fuel pump.

16. A fuel supplying apparatus for supplying a fuel, comprising:
a fuel tank that stores the fuel therein;
a fuel pump that pumps the fuel stored in the fuel tank out of the fuel tank;
a take-up passage disposed in the fuel tank and connected to the fuel pump, the take-up passage having a fuel take-up opening that opens at a lower position within the fuel tank and a gas take-up opening that opens above the fuel take-up opening within the fuel tank;
an air separator that separates an air contained in the fuel from the fuel, the air separator connected to a downstream side of the fuel pump; and
a fuel pressure adjuster that adjusts a pressure of the fuel in a fuel supplying passage for supplying fuel from, at least, a downstream side of the fuel pump and through the air separator, to a predetermined pressure,
wherein the fuel pump removes the fuel and any gas in the fuel tank from the fuel tank, via the take-up passage.

17. A fuel supplying apparatus according to claim 16, wherein the gas take-up opening is fixed near an upper wall of the fuel tank.

18. A fuel supplying apparatus according to claim 17, wherein the gas take-up opening is fixed and attached to the upper wall of the fuel tank.

19. A fuel supplying apparatus according to claim 16, wherein the gas take-up opening is provided on a float that is floatable on a fuel liquid surface within the fuel tank.

20. A fuel supplying apparatus according to claim 16, further comprising a separating wall that is displaceable within an internal space of the fuel tank in accordance with an amount of the fuel stored in the fuel tank and that divides the internal space of the fuel tank into a fuel chamber and an air chamber, wherein the take-up passage is disposed inside the fuel chamber.

21. A fuel supplying method for supplying fuel, comprising:
taking up the fuel in a fuel tank via a fuel take-up opening that opens at a lower position in the fuel tank;
taking up a gas in the fuel tank via a gas take-up opening that opens above the fuel take-up opening within the fuel tank, by using a fuel pump
connecting a fuel supplying passage to a downstream side of the fuel pump;
separating the fuel supplied into the fuel supplying passage from the fuel pump and an air contained in the fuel; and
adjusting a pressure of the fuel in the fuel supplying passage to a predetermined pressure.

22. A fuel supplying method according to claim 21, wherein the air separated from the fuel supplied into the fuel supplying passage from the fuel pump is supplied into an intake passage of an internal combustion engine.

23. A fuel supplying method according to claim 21, wherein the air separated from the fuel supplied into the fuel supplying passage from the fuel pump is released into an atmosphere.

24. A fuel supplying method according to claim 21, wherein the pressure of the fuel in the fuel supplying passage is maintained at or above the vapor pressure of the fuel.

* * * * *